United States Patent [19]

Hitzky

[11] Patent Number: 4,823,853

[45] Date of Patent: * Apr. 25, 1989

[54] NOISE CONTROL TECHNIQUES FOR TIRES EMPLOYING THREE DIFFERENT SIZE DESIGN CYCLES

[75] Inventor: Leo J. Hitzky, Luxembourg, Luxembourg

[73] Assignee: The Goodyear Tire & Rubber Company, Akron, Ohio

[*] Notice: The portion of the term of this patent subsequent to Jan. 26, 2005 has been disclaimed.

[21] Appl. No.: 865,447

[22] Filed: May 21, 1986

[51] Int. Cl.$^4$ .............................................. B60C 11/03
[52] U.S. Cl. .............................................. 152/209 R
[58] Field of Search ........... 152/209 R, 209 D, 209 A

[56] References Cited

U.S. PATENT DOCUMENTS

| 2,006,197 | 6/1935 | Ewart et al. | 152/209 P |
| 2,808,867 | 10/1957 | Buddenhagen et al. | 152/209 R |
| 3,023,798 | 3/1962 | Moore et al. | 152/209 R |
| 4,721,141 | 1/1988 | Collette | 152/209 A |

FOREIGN PATENT DOCUMENTS

| 0018408 | 1/1985 | Japan | 152/209 R |
| 0060011 | 4/1985 | Japan | 152/209 P |
| 2014520 | 8/1979 | United Kingdom | 152/209 R |

OTHER PUBLICATIONS

Willett, Tire Tread Pattern Sound Generation, Tire Science and Technology vol. 3, No. 4, Nov. 1975, pp. 252–266.

Primary Examiner—Michael W. Ball
Assistant Examiner—Geoffrey L. Knable
Attorney, Agent, or Firm—Allegretti & Witcoff, Ltd.

[57] ABSTRACT

A tire adapted to rotate around an axis and including a plurality of design cycles extending circumferentially around the tire. The design cycles have a total of three different pitch lengths that define a percent variation and a percent unbalance, the product of the percent variation and the percent unbalance lying in the range of 1,250 to 1,350.

1 Claim, 2 Drawing Sheets

NOISE CONTROL TECHNIQUES FOR TIRES EMPLOYING THREE DIFFERENT SIZE DESIGN CYCLES

BACKGROUND OF THE INVENTION

1. Field of the Invention

This invention relates to tire treads, and more specifically relates to tire treads in which repeating design cycles or pitches are altered in order to control noise.

2. Description of Related Art

In the past, tire treads have been designed by the use of repeating design cycles or pitches extending circumferentially around the periphery of the tire. The circumferential length of the design cycles or pitches has been modulated in order to achieve objectives such as spreading the noise generated by the tire over a broad band of frequencies. In many such tires, multiple lengths of design cycles are utilized. Many tires have incorporated three discrete different sizes of design cycles or pitches that are placed around the peripheries of such tires. Typical ratios of lengths of the small, medium and large pitches used in such tires are shown in Table 1:

TABLE 1

| Ratios | % Variation |
|---|---|
| 9-10-11 | 22.2 |
| 11-13-15 | 36.4 |
| 5-6-7 | 40.0 |
| 9-11-13 | 44.4 |
| 7-9-11 | 57.1 |
| 9-10-12 | 33.3 |
| 6-7-9 | 50.0 |

Typical pitch ratios used in conventional three-pitch tires are listed under the column entitled "Ratios." The first entry under the column headed "Ratios," reading "9-10-11," indicates a tire in which the small, medium and large pitch lengths have the ratio 9-10-11. Opposite the pitch ratio is a number indicating the percent variation from smallest to largest pitch. The percent variation is obtained from subtracting the smallest term of the pitch ratio from the largest term of the pitch ratio, dividing the remainder by the smallest term of the pitch ratio and multiplying by 100. For the first entry in Table 1, the percent variation is defined as $((11-9)/9) \times 100$.

In this specification and claims, pitch ratios of three-pitch tires are expressed as three integers that cannot be reduced to three lesser integers by a common divisor.

SUMMARY OF THE INVENTION

The inventor has discovered that the noise created as a three-pitch tire rotates over a road surface can be better controlled by controlling the percent variation of the pitch ratios in combination with the percent unbalance of the pitch ratios. The percentage unbalance is defined by the following Formula 1:

$$\% \text{ Unbalance} = \frac{(L - M)(M - S)}{(M - S)} \times 100 \quad \text{Formula 1}$$

wherein L is the large pitch ratio term, M is the medium pitch ratio term, and S is the small pitch ratio term in a three-pitch tire. Surprisingly, the applicant has discovered that if the product of the percent variation and percent unbalance is between about 1,250 to 1,350, improved noise control properties result.

DESCRIPTION OF THE DRAWINGS

These and other advantages and features of the invention will hereafter appear for purposes of illustration, but not of limitation, in connection with the accompanying drawings, wherein like numbers refer to like parts throughout, and wherein.

DESCRIPTION OF THE PREFERRED EMBODIMENTS

Figure 1:
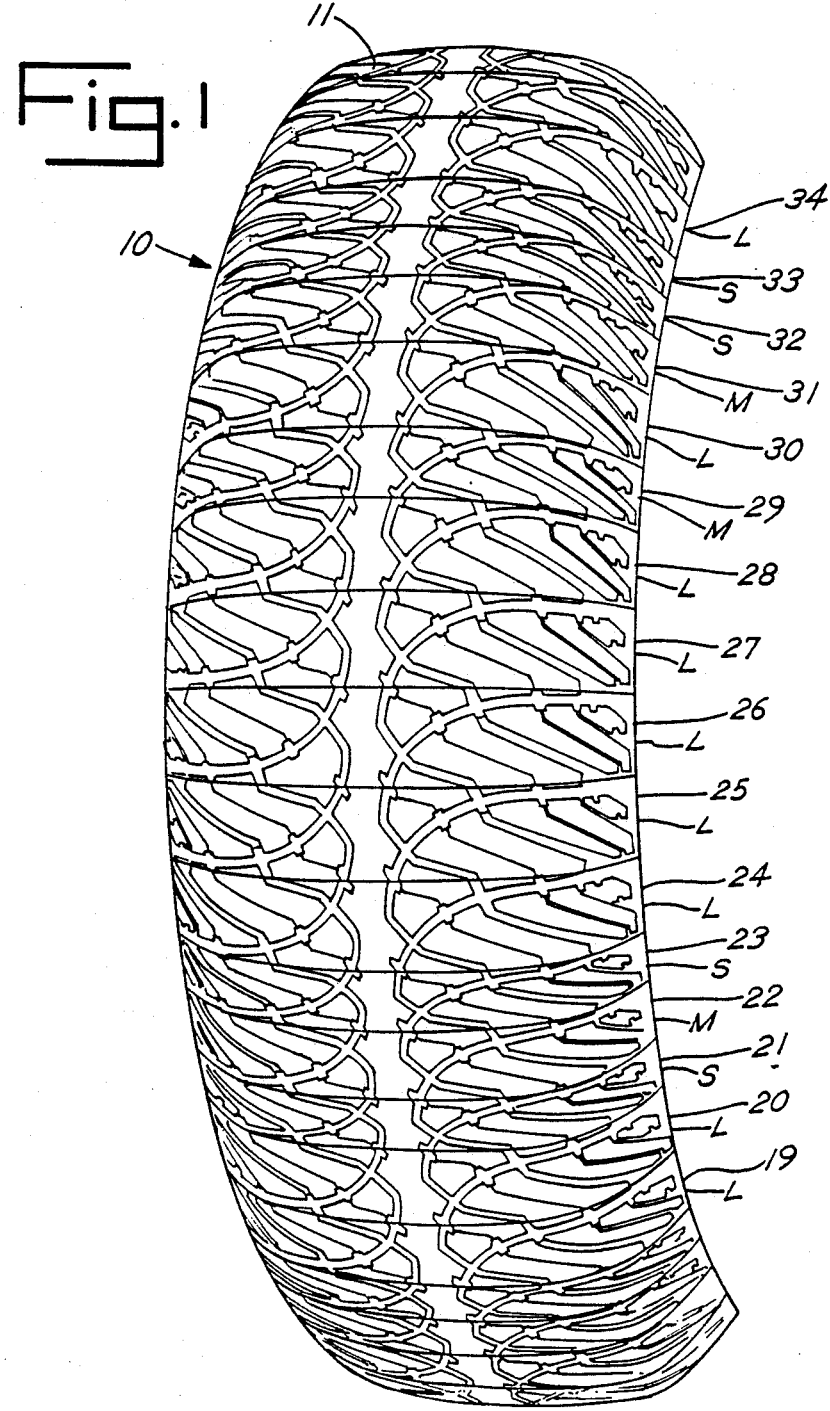
FIG. 1 is a fragmentary, schematic, perspective view of a tire having a tread employing a preferred 17-21-26 pitch ratio and a combined percent variation and percent unbalance in accordance with the present invention.

Referring to the drawings, FIG. 1 shows an exemplary tire 10 having a tread with an outer surface 11. Exemplary tread design cycles or pitches, such as 19–34, extend around the periphery of the tire. The generally horizontal lines extending across the tire tread indicate boundaries of the design cycles or pitches. The letters S, M and L indicate small, medium or large design cycle lengths or pitch lengths, respectively. The design cycles have three distinct and discrete different sizes having different ratios and sequences depending on the type of application intended. For example, for highway passenger tires, the preferred ratio of the three discrete sizes is 17-21-26, and the preferred pitch sequence for a 64 pitch tire is: S S M M L L L S S L M S L L S M S L L L L L M L M S S L M S M M L S S M M S M M L L S M S L M S M S S M L S S M L L L M L M M M, where S, M and L are the small, medium and large pitch lengths, respectively.

Figure 2:
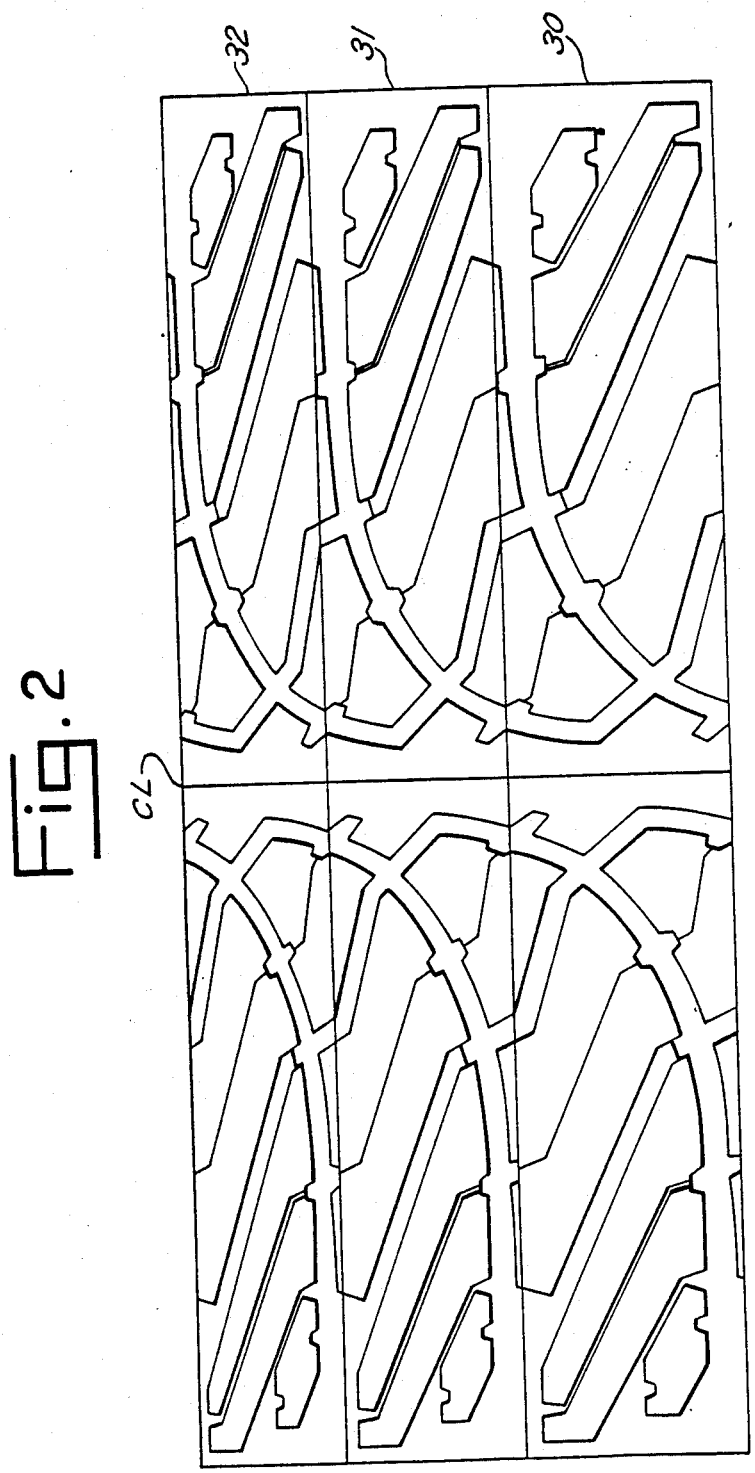
FIG. 2 is a schematic, enlarged representation of small, medium and large design cycles or pitches of the tire shown in FIG. 1 projected onto a flat surface.

Pitches 30–32 are shown enlarged and projected onto a flat surface in FIG. 2 with reference to a center line CL.

For light truck tires, the preferred pitch ratio is 18-21-25.

For medium and large truck tires, the preferred pitch ratio is 19-21-24.

The percent variation, percent unbalance, and the product of the percent variation and percent unbalance for the foregoing preferred embodiments are shown in Table 2:

TABLE 2

| Ratios | % Variation | % Unbalance | Var. × Unbal. |
|---|---|---|---|
| 17-21-26 | 52.9 | 25.0 | 1323 |
| 18-21-25 | 38.9 | 33.3 | 1295 |
| 19-21-24 | 26.3 | 50.0 | 1315 |

The applicant has surprisingly discovered that the preferred embodiments exhibit products of percent variation times percent unbalance which are nearly constant within a tolerance of about two percent. In particular, the applicant has discovered that three-pitch tires having pitch ratios with a product of percent variation times percent unbalance within a range of about 1,250 to 1,350 produce superior noise control and enable the noise to be spread over a broad band of frequencies.

What is claimed is:

1. A tire provided with a tread comprising:
   a plurality of repeating design cycles placed continuously about the circumference of said tire, said design cycles having a total of three different design cycle lengths including a short length, a medium length, and a long length that define a percent variation and a percent unbalance, wherein the three design cycle lengths have a ratio of about 17-21-26.

* * * * *

UNITED STATES PATENT AND TRADEMARK OFFICE
CERTIFICATE OF CORRECTION

PATENT NO. : 4,823,853

DATED : April 25, 1989

INVENTOR(S) : LEO J. HITZKY

It is certified that error appears in the above-identified patent and that said Letters Patent is hereby corrected as shown below:

In Column 1, line 57, Formula 1 should read as follows:

$$\% \text{ Unbalance} = \frac{(L - M) - (M - S)}{(M - S)} \times 100 \qquad \text{Formula 1}$$

Signed and Sealed this

Seventeenth Day of April, 1990

Attest:

HARRY F. MANBECK, JR.

*Attesting Officer*     *Commissioner of Patents and Trademarks*